US011888867B2

(12) United States Patent
St. Pierre

(10) Patent No.: US 11,888,867 B2
(45) Date of Patent: Jan. 30, 2024

(54) PRIORITY BASED DEEP PACKET INSPECTION

(71) Applicant: Arbor Networks, Inc., Westford, MA (US)

(72) Inventor: Brian St. Pierre, Acworth, NH (US)

(73) Assignee: ARBOR NETWORKS, INC., Westford, MA (US)

(*) Notice: Subject to any disclaimer, the term of this patent is extended or adjusted under 35 U.S.C. 154(b) by 153 days.

(21) Appl. No.: 17/115,965

(22) Filed: Dec. 9, 2020

(65) Prior Publication Data
US 2022/0182398 A1 Jun. 9, 2022

(51) Int. Cl.
*H04L 9/40* (2022.01)

(52) U.S. Cl.
CPC ...... *H04L 63/1416* (2013.01); *H04L 63/0236* (2013.01); *H04L 63/101* (2013.01); *H04L 63/1458* (2013.01); *H04L 2463/143* (2013.01)

(58) Field of Classification Search
CPC .......... H04L 2463/143; H04L 63/0236; H04L 63/101; H04L 63/1416; H04L 63/1458
See application file for complete search history.

(56) References Cited

U.S. PATENT DOCUMENTS

| 9,338,181 B1* | 5/2016 | Burns | H04L 63/1433 |
| 2008/0201772 A1* | 8/2008 | Mondaeev | H04L 47/12 726/13 |
| 2011/0199902 A1* | 8/2011 | Leavy | H04L 47/22 370/232 |
| 2012/0079592 A1* | 3/2012 | Pandrangi | H04L 47/10 709/224 |
| 2012/0243459 A1* | 9/2012 | Wu | H04L 12/184 370/312 |
| 2013/0091579 A1* | 4/2013 | White | H01R 24/64 726/25 |
| 2013/0139245 A1* | 5/2013 | Thomas | H04L 47/32 726/13 |
| 2014/0259140 A1* | 9/2014 | Subramanian | H04L 63/1408 726/11 |
| 2016/0269430 A1* | 9/2016 | Laswell | H04L 63/0245 |
| 2018/0091453 A1* | 3/2018 | Jakobsson | H04L 63/1441 |
| 2019/0132334 A1* | 5/2019 | Johns | G06F 21/562 |
| 2019/0334940 A1* | 10/2019 | Bar Noy | H04L 43/04 |
| 2021/0144161 A1* | 5/2021 | Mittal | H04L 63/0236 |
| 2022/0060474 A1* | 2/2022 | Trentini | H04L 63/1408 |

* cited by examiner

Primary Examiner — Daniel B Potratz
Assistant Examiner — Matthias Habtegeorgis
(74) Attorney, Agent, or Firm — Foley & Lardner LLP

(57) ABSTRACT

A method of monitoring a network is provided. The method includes receiving a packet of network traffic, determining a source IP address of the packet, consulting a database of source IP addresses, each source IP address having an associated probability of threat indicator (PTI) that indicates a probability of threat posed by the source IP address. The packet's source IP address' PTI is assigned to the packet as the packet's PTI, and one or more inspection checks are selected to be performed on the packet, wherein the selection of the inspection checks is a function of the packet's source IP address PTI. The method further includes performing the selected inspection checks, assigning treatment of the packet based on a result of the inspection checks performed, and adjusting the packet's source IP address' PTI or the packet's PTI based on the result of the one or more inspection checks performed.

16 Claims, 4 Drawing Sheets

PRIORITY BASED DEEP PACKET INSPECTION

FIELD OF THE DISCLOSURE

Embodiments of the present disclosure relate generally to methods and systems for monitoring network traffic, and specifically to priority based deep packet inspection of the network traffic.

BACKGROUND OF THE DISCLOSURE

Deep Packet Inspection (DPI) is a technique that is used for, among other things, mitigating network distributed denial of service (DDoS) attacks. During a DDoS attack, a network monitor provides protection to a client network by distinguishing between attack packets and legitimate client packets and the attack packets, which can amount to dropping a large amount of packets.

During DPI, the network monitor inspects detailed contents of packets to make a determination about the disposition of each packet. The network monitor may also keep a record of the activities of sources of inspected packets so that a history of behavior can be consulted to help decide when packets should be dropped. Typically, the network monitor decides whether to drop a packet based on a static, predetermined test, such as a comparison of traffic rate to a threshold, a result of pattern matching against packet contents, challenge-response behavior patterns, or other techniques.

Since the size of an attack tends to grow in terms of traffic rate, the network monitor and associated mitigation devices have a need to scale up DPI and mitigation techniques depending on traffic rates. Two methods of scaling include (a) spreading load across multiple cooperating network monitor devices that perform the DPI and (b) spreading the load within a network monitor device across multiple internal processing devices, such as CPUs or cores. Two typical load-balancing techniques for distributing incoming traffic to these multiple network monitor devices and/or their internal processing devices involve hashing parts of the packet and using a modulus of that hash as an identifier of the device (network monitor device or internal processing device) that will receive the packet. For example, "Layer 3" hashing is performed by using just source and destination internet protocol (IP) addresses and "Layer 4" hashing is performed by using source and destination IP addresses, source and destination port addresses, and the IP protocol number.

However, when these load-balancing techniques are employed, each independent device (network monitor device or internal processing component) does not have information about what the other devices are seeing during DPI. In other words, load-balancing can make it harder for each device to build a behavior history for respective sources of network traffic. One way to overcome this disadvantage is for the devices to share information with each other about behaviors seen by various sources of network traffic, but this information sharing adds expense in terms of complexity, CPU cycles, and inter-process communication bandwidth.

Conventional methods and systems for performing DPI to detect and mitigate against DDoS attacks have generally been considered satisfactory for their intended purpose. However, there is still a need in the art for DPI that reduces the cost of the inspection by individual devices (network monitor devices or internal processing components) and is conducive to information sharing between devices.

SUMMARY OF THE DISCLOSURE

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method of monitoring a network is provided. The method includes receiving a packet of network traffic, determining a source IP address of the packet, and consulting a database of source IP addresses. Each source IP address stored in the database has an associated probability of threat indicator (PTI), wherein the PTI indicates a probability of threat posed by the source IP address. The method further includes assigning the packet's source IP address' PTI to the packet as the packet's PTI and selecting one or more inspection checks to perform on the packet, wherein the selection of the one or more inspection checks is a function of the packet's source IP address' PTI. The method further includes performing the selected one or more inspection checks, assigning treatment of the packet based on a result of the one or more inspection checks performed, and adjusting the packet's source IP address' PTI and/or the packet's PTI based on the result of the one or more inspection checks performed.

In one or more embodiments, the method can further include dropping the packet if the packet's source IP address' PTI is below a block list threshold, and only selecting the one or more inspection checks if the packet's source IP address' PTI is not below the block list threshold.

In one or more embodiments, the method can further include forwarding the packet if the packet's source IP address PTI is above an allow list threshold, and only selecting the one or more inspection checks if the packet's source IP address' PTI is not above the allow list threshold.

In one or more embodiments, the method can further include accessing a collection of inspection checks, each inspection check having an associated check threshold. Selecting the one or more inspection checks can further include comparing the packet's source IP address PTI with the check threshold associated with one of the inspection checks and deciding whether or not to select the inspection check based on a result of the comparison.

In one or more embodiments, the method can further include selecting the one or more inspection checks can further include continuing to compare the packet's source IP address' PTI with the check threshold associated with a next inspection check of the collection of inspection checks and deciding whether or not select the next inspection check, until the packet's source address' PTI has been compared to all of the inspection checks in the collection or the treatment assigned to the packet causes the packet to be dropped after which no further inspection checks are performed on the packet.

In one or more embodiments, if the packet's source IP address is not included in the database of source IP addresses, the method can further include storing the packet's source IP address in the database of source IP addresses with an associated PTI that is set to a neutral value.

In one or more embodiments, adjusting the packet's PTI can be performed before selecting another of the one or more inspection checks to perform on the packet.

In one or more embodiments, adjusting the packet's PTI can be a function of a number of times the at least one of the one or more inspection checks was passed or failed.

In one or more embodiments, adjusting the packet's source IP address' PTI can be a function of a number of times at least one of the one or more inspection checks was passed or failed.

In other aspects of the disclosure, a network monitor system and a non-transitory computer readable storage medium are each provided for monitoring a network. The network monitor system includes a memory configured to store instructions and a processor in communication with the memory. The instructions, which when executed by the processor, cause the processor to perform the disclosed method. The non-transitory computer readable storage medium stores a program, which when executed by the computer system causes the computer system to perform the disclosed method.

BRIEF DESCRIPTION OF THE DRAWINGS

The accompanying appendices and/or drawings illustrate various, non-limiting, examples, inventive aspects in accordance h the present disclosure.

DETAILED DESCRIPTION OF CERTAIN EMBODIMENTS

Figure 1:
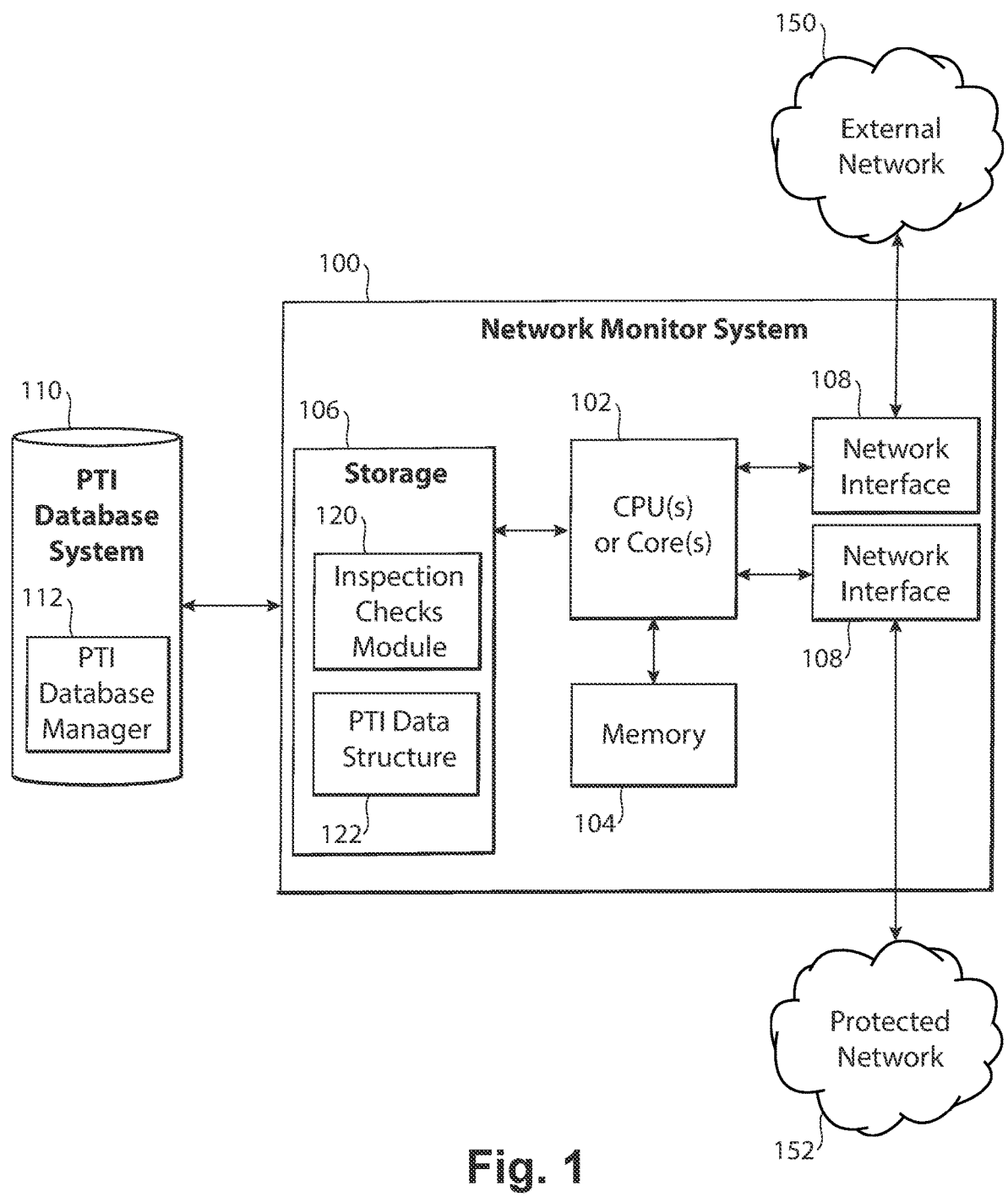
FIG. 1 illustrates a block diagram of an example network monitor system and the potential threat indicator (PTI) database system, in accordance with one or more embodiments of the present disclosure.

The present disclosure is now described more fully with reference to the accompanying drawings, in which illustrated embodiments of the present disclosure are shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below can be configured as a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the disclosure based on the below-described embodiments. Accordingly, the disclosure is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

It is to be further understood the illustrated embodiments of the present disclosure describe a system, apparatus, and method for effectively applying deep packet inspection (DPI) for detecting and/or mitigating distributed denial of service (DDoS) attacks that enables information sharing and pre-inspection lookup to promote sharing information revealed through DPI performed by independent monitor devices or internal processors. In addition, the DPI is prioritized based on probabilistic determinations, which reduces the cost (e.g., central processor unit (CPU) cycles for inspecting each packet) and decreases the probability of dropping legitimate traffic.

Turning now descriptively to the drawings, in which similar reference characters denote similar elements throughout the several views, FIG. 1 illustrates a network monitor system 100 applies deep packet inspection (DPI) to inspect network traffic. The network monitor system 100 includes one or more central processing units (CPU) or CPU cores 102, memory 104 (e.g., random access memory (RAM)), and storage 106 (meaning nonvolatile (e.g., long term) storage, such as disk(s)), and one or more network interfaces 108. Memory 104 can store programmable instructions that when executed by the CPU cause the CPU to perform operations described herein. Storage 106 stores an inspection checks module 120 that includes a collection of one or more checks that are used for performing DPI. Network monitor system 100 can be implemented as physical or virtual devices. Whether implemented as physical or virtual device(s), network monitor system 100 uses a local or remote hardware processing device that executes software instructions, which enables performance of the disclosed functions.

Network monitor system 100 receives packets of network traffic from an external network 150, such as the Internet, and inspects the packets. Based on results of the inspection, the network monitor system 100 determines treatment of the packets, such as forwarding to a protected network 152 or dropping the packets. Network monitor system 100 is further in communication with a probability of threat indicator (PTI) database system 110, which can be remote from or integrated with network monitor system 100. PTI database system 110 stores a plurality of internet protocol (IP) addresses with a PTI associated to each address.

The PTI indicates a probability of threat posed by the source IP address, and can be represented, for example, as a weight. The PTI can be a default value or a value that was determined or adjusted by the network monitor system 100. For example, the PTI can have a value assigned from a scale where 0 is neutral, negative values are associated with malicious behavior, and positive values are associated with legitimate behavior or a known identity of a source IP address. The higher the absolute value of the value, the higher the probability that the associated source IP address is malicious or legitimate.

Inspection checks module 120 stores a collection of inspection checks (also referred to as "checks"). In one or more embodiments, inspection checks module 120 further stores consideration rules. Each check has an associated check threshold and a set of one or more inspection rules. An example check performed in accordance with inspection rules include determining whether a packet matches a legitimate or malicious pattern. If the packet matches, its PTI can be adjusted to indicate that the packet is probably legitimate or probably malicious. Another example check includes determining whether the packet passes (or fails) a challenge-response test or similar behavior analysis, indicating that the packet is probably legitimate (or probably malicious). Another example check includes determining that the packet's source IP address exceeds a threshold traffic rate, indicating that the packet is probably malicious. Another example check includes determining whether the packet fails a malformed packet check, indicating that the packet is probably malicious.

The inspection rules may further specify whether the packet's PTI should be adjusted upon a first occurrence, or whether an occurrence counter should be adjusted and the packet's PTI should only be adjusted upon the occurrence counter reaching a first occurrence threshold specified by the inspection rules.

The inspection rules may further specify whether the packet's Source IP address PTI should be adjusted upon a first occurrence, or whether an occurrence counter should be adjusted and the packet's Source IP address PTI should only be adjusted upon the occurrence counter reaching a second occurrence threshold specified by the inspection rules.

Network monitor system 100 includes or communicates with hardware, firmware, and/or software components that are configured to observe content of packets included in network traffic. Network monitor system 100 can include central or distributed elements for intercepting and/or analyzing network data. These elements can be passive or active and include software, firmware, and/or hardware components, such as taps, probes, or port mirrors. These elements can be positioned inline, and/or remote relative to communication links between external network 150 and network monitor system 100. In one or more embodiments, network monitor system 100 can be configured, for example and without limitation, similar to devices such as Arbor Edge Defense™, Arbor Sightline™, or Arbor™ Threat Mitigation System by Arbor Networks, Inc. of Westford, Massachusetts.

In one or more embodiments, network monitor system 100 or portions thereof can be located at an edge (inside or outside) of protected network 152 or deeper within the protected network 152. In one or more embodiments, network monitor system 100 is located within the external network 150, such as in a service provider network.

In the example shown, one protected network 152 is shown, however one skilled in the art will recognize that the network monitor system 100 can provide a protection service to multiple protected networks 152. Protected network 152 can include one or more networks, such as an intranet, a local area network (LAN), virtual LAN (VLAN), and/or a wide area network (WAN) to support communication between multiple protected hosts (not shown). In examples, protected network 152 can be an enterprise network, such as a school network, business network, and government network, to list a few non-limiting examples, that can connect to the Internet.

Each protected host can be a device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets.

Network monitor system 100 receives network traffic from external network 150 via network interface 108 and begins inspection of a packet received in the network traffic by determining the packet's source IP address. Network monitor system 100 consults PTI database system 110 for a PTI associated with the packet's source IP addresses and assigns the PTI to the packet. Network monitor system 100 selects one or more inspection checks from inspection checks module 120 to perform on the packet. The selection of the inspection check(s) is a function of the packet's PTI. For example, if the PTI is below a block list threshold, the packet may be dropped without performing any inspection checks. If the PTI is above an allow list threshold, the packet may be forwarded to its destination IP address without performing any inspection checks. Otherwise, the PTI can proceed to selecting and performing inspection checks based on the PTI.

The order in which the checks are considered for selection or not can be based on the consideration rules. A collection of one or more checks stored in inspection checks module 120 is accessed and a first inspection check is identified. The first inspection check can be a default first check or can be selected to be the first check based on application of the packet's PTI to the consideration rules. The first check is only performed if the packet's PTI is above the first check's check threshold. If the first check is not performed due to a determination that the packet's PTI is not above the first check's threshold, a next check is selected based on the consideration rules. The next check is only performed if the PTI is above the next check's check threshold. The process can continue iteratively until there are no more checks based on the consideration rules.

In one or more embodiments, the consideration rules merely include an ordered list of the checks. The ordered list can prioritize certain checks over other checks. In one or more embodiments, the checks can be ordered based on the value of their respective, associated check thresholds. The first check selected can be the first check in the ordered list, or can be selected based on the check thresholds of the checks in the ordered list and the packet's PTI. The next check can be selected by selecting the next check in the ordered list. Alternatively, the consideration rules can include logic with decision points that take the packet's PTI into consideration.

Performance of each check includes applying the check's associated inspection rules. Performance of the check can further include marking the packet to be immediately dropped as a function of a result of applying the check's inspection rules. Furthermore, the packet's PTI can be adjusted as a function of a result of applying the check's inspection rules. Additionally, performance of the check can include adjusting the PTI database system 110 by adjusting the stored PTI associated with packet's source IP address to reflect the adjustment to the packet's PTI. The packet is dropped if marked to be immediately dropped. Otherwise, a next check is selected until there are no more checks to be considered. Once all of the checks have been considered, the packet's PTI is compared to a drop threshold. If the packet's PTI exceeds a drop threshold, the packet is dropped, otherwise the packet is forwarded. The process can continue by receiving processing a next packet.

When the packet's PTI has a positive value, the magnitude of the value indicates the probability that the packet is legitimate. The higher the magnitude, the less likely that the packet's source IP address is likely to send malicious traffic. When the magnitude is above the allow list threshold, this indicates that the packet's source IP address matches a global or local list of addresses that do not require full packet inspection. In this case, the packet's source IP address may be explicitly listed by the administrator in an allow list, or the source IP address may have been determined to previously send packets that match a pattern known to be associated with legitimate clients, have passed a challenge-response analysis, or have passed some other check that provides results showing a high probability of legitimacy.

When the magnitude is below the block list threshold, this indicates that the packet's source IP address matches a global or local list of addresses that are known to be malicious, hence the packet is dropped. In this case, the packet's source IP address may be explicitly listed by the administrator in a block list, or the source IP address may have been determined to previously send packets that match a pattern known to be malicious, have failed a challenge-response analysis, or have failed some other check that provides results showing a high probability of being malicious.

When the packet's source IP address is not included in the PTI database system 110, the packet's PTI can be set to zero as a default value. Packets having a PTI equal to zero undergo a standard set of checks, as configured by an administrator. The checks will provide legitimate clients an opportunity to increase the PTI associated with their source IP addresses and malicious actors to decrease the PTI associated with their source IP addresses.

When the packet's PTI is above zero but below the allow list threshold, the packet is probably legitimate, with the degree of probability corresponding to the magnitude of the PTI. The higher the probability that the packet is legitimate, the less checks that need to be performed on the packet, and the checks to be performed may be simpler and consume less cost (CPU time, memory, etc.). For example, the administrator may configure the monitor system 100 to decrease the amount of checks performed at a selected magnitude in order to avoid over-blocking.

When the packet's PTI is below zero but its magnitude does not exceed the block list threshold, the packet is probably malicious, with the degree of probability corresponding to the magnitude of the PTI. The amount of checking, in terms of the number of checks and/or the complexity of the checks that can drive up cost, can vary in correspondence to the degree of probability. For example, the administrator may configure the monitor system 100 to decrease the amount of checks performed at a relatively high magnitude in order to spend fewer resources performing expensive inspections on suspicious packets. Conversely, at low magnitudes there is less certainty about the PTI. Due to the decreased certainty, the administrator may configure the monitor system 100 to perform more expensive checks, which can cause the magnitude of the PTI to increase, indicating increased certainty for making determinations about treatment of the packet and/or future packets sent from the source IP address.

Accordingly, a tiered number of checks is assigned to be performed to the packets based on each packet's PTI, wherein the PTI reflects knowledge about historical behavior of the source IP address of the packet and thus likelihood about the packet is legitimate or malicious. More specifically, the PTI reflects a probability of whether the packet is legitimate or malicious. The source IP address' PTI can be continually adjusted by the network monitor system. Checks used for DPI of a packet are prioritized based on whether (and to what degree) the packet's PTI is below the check's threshold, When the packet's PTI is not below a check's check threshold, that that check may be not included with the checks used for DPI. The number of checks can be reduced in certain instances to reduce the cost of inspecting a packet and to decrease dropping of legitimate packets.

Figure 2:
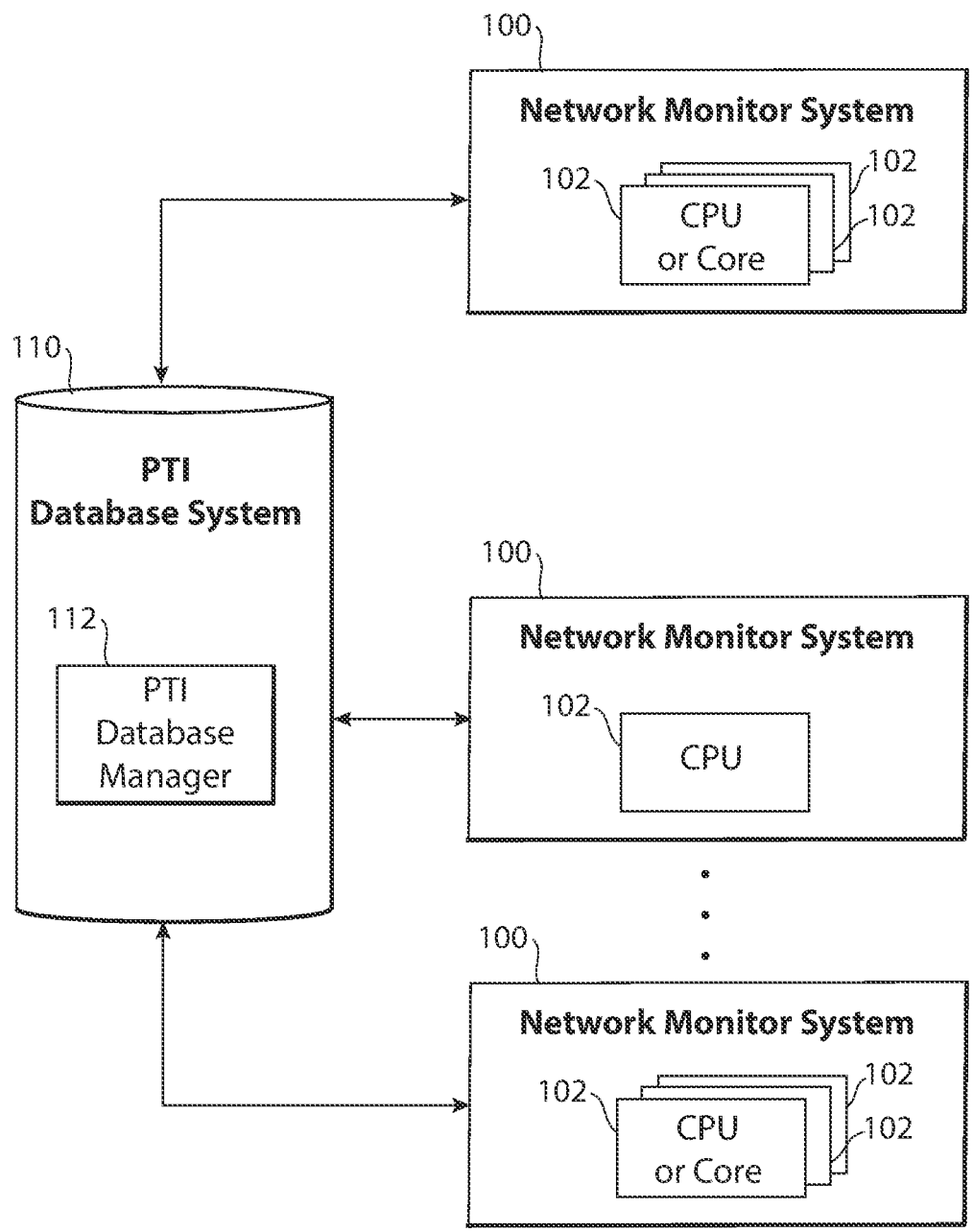
FIG. 2 illustrates a block diagram of multiple network monitor systems sharing information via the potential threat indicator (PTI) database system, in accordance with one or more embodiments of the present disclosure.

FIG. 2 illustrates that multiple independent devices, including multiple network monitor systems 100 and/or multiple CPUs or CPU cores 102 of one or more respective network monitor systems 100 can access PTI database to obtain PTIs associated with Source IP addresses of received packets and to adjust the PTIs associated with an Source IP addresses of a packet that was inspected. In this way the PTI for an Source IP address can be adjusted by any of the independent devices, allowing the independent devices to share information with each other that was observed about behaviors associated with various IP sources addresses of network traffic, caused a packet PTI to be adjusted, and further caused the PTI associated with the source IP address of the packet.

PTI database system 110 provides a single centralized process for managing association of PTIs to source IP addresses based on feedback from various independent monitor systems 100 or CPUs or cores 102. In one or more embodiments, information compiled by PTI database system 110 can be stored by PTI database system 110 and accessed by the monitor systems 100 and their CPUs or cores 102 for obtaining or adjusting PTIs associated with specified source IP addresses. In one or more embodiments, the plurality of source IP addresses and associated PTIs can be stored in a data structure and distributed, e.g., periodically or in response to an event, to the individual monitor systems 100. Each monitor system 100 can store a copy of the data structure in storage 106 as PTI data structure 122. Multi-core CPUs 102 can share a PTI data structure 122 stored in the host monitor system's storage 106. The CPU or cores 102 of individual monitor systems 100 can access its corresponding PTI data structure 122 to obtain PTIs for source IP addresses of received packets and adjust the PTIs based on results of checks performed on the packets.

The PTI database system 110 can be adjusted, e.g., periodically or in response to an event, using contents of the PTI data structures 122 of the different network monitors 100. A manager 112 of PTI database system 110 can apply reconciliation rules to reconcile differences in PTI adjustments from different monitor systems 100 or CPUs or cores 102. For example, the PTI database manager 112 may simply sum the weights of the adjustments from different network monitor systems 100, or it may weight the adjustments coming from certain network monitor systems 100 more heavily. This weighting could, for example, be due to the fact that certain network monitor systems 100 are processing more traffic and are thus more likely to make a better determination.

Figure 3:
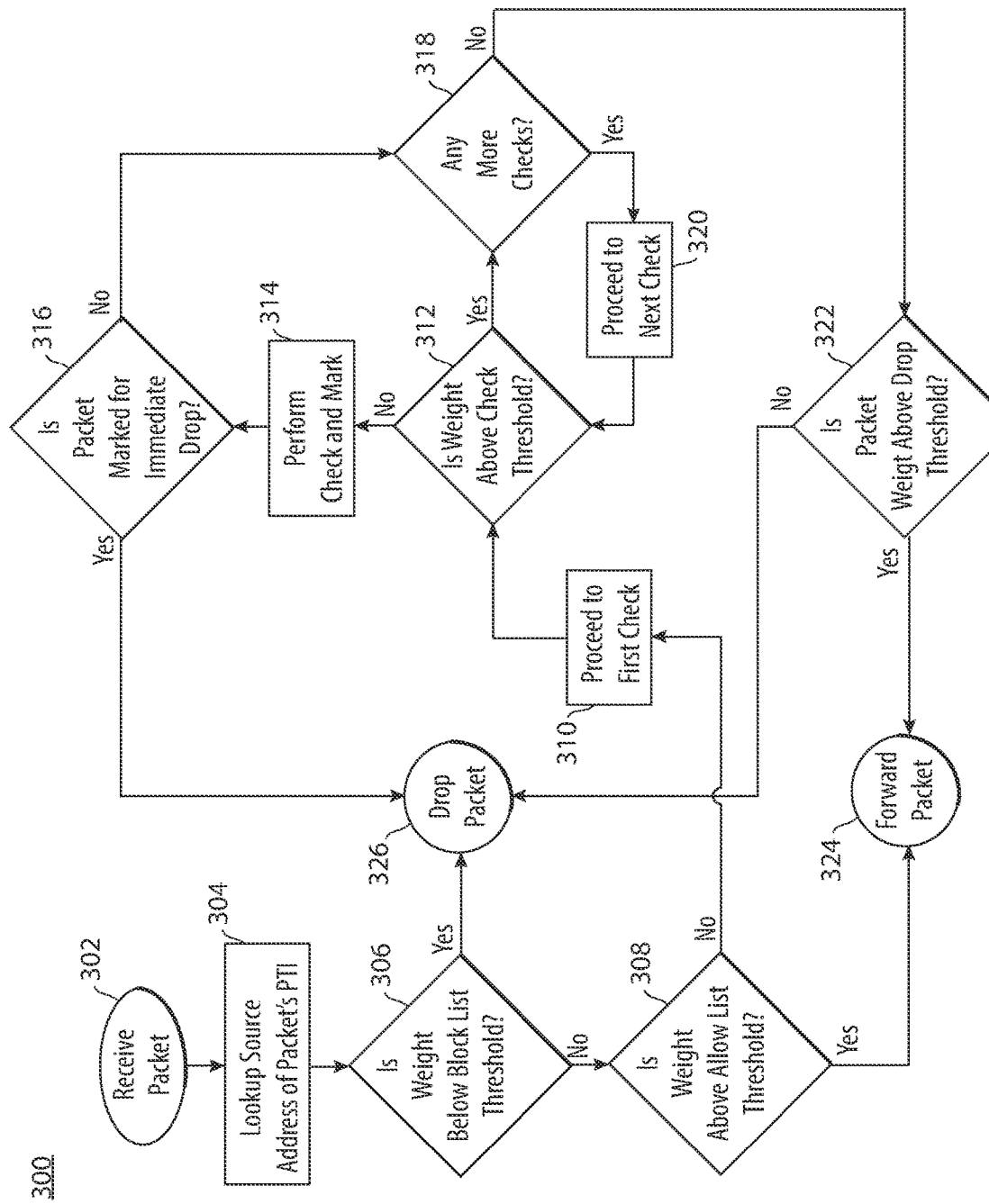
FIG. 3 illustrates a flow diagram of an example method for monitoring a network, in accordance with one or more embodiments of the present disclosure.

FIG. 3 shows an exemplary and non-limiting flowchart illustrating a method for monitoring a network in accordance with certain illustrated embodiments. The method can be performed by a network monitor system and a PTI database system, such as network monitor system 100 and PTI database system 110. Before turning to description of FIG. 3, it is noted that the flowchart in FIG. 3 shows example methods in which operations are carried out in a particular order, as indicated by the lines connecting the blocks, but the various steps shown in this diagram can be performed in a different order, or in a different combination or sub-combination. It should be appreciated that in some embodiments, some of the steps described below may be combined into a single step. In some embodiments, one or more additional steps may be included. In some embodiments, one or more of the steps can be omitted.

With reference to example flowchart 300, of FIG. 3, at block 302, network traffic is received from an external network. At block 304, a PTI database system is consulted for a PTI associated with the packet's source IP addresses. The PTI is assigned to the packet and is referred to as the packet's PTI. The PTI database system stores a plurality of IP addresses with a PTI associated to each address, and the PTI indicates a probability of threat posed by the source IP address, and can be represented, for example, as a weight. If the IP address is not found in the PTI database system, a default value (in this example, zero) is assigned, wherein the default value represents a neutral probability of threat.

At block 306, a determination is made whether the packet's PTI is below a block list threshold. If the determination at block 306 is YES, the packet is below the block list threshold, then at block 326 the packet is dropped. If the determination at block 306 is NO, the packet is not below the block list threshold, then the method continues at block 308.

At block 308, a determination is made whether the packet's PTI is above an allow list threshold. If the determination at block 308 is YES, the packet is above the allow list threshold, then at block 324 the packet is forwarded. If the determination at block 308 is NO, the packet is not above the allow list threshold, then the method continues at block 310. In one or more embodiments, blocks 306 and 308 can be omitted, performed by a different unit, and/or performed at a different stage of the network monitoring.

At block 310, a collection of one or more checks is accessed and a first check is identified, wherein each check has an associated check threshold and a set of one or more inspection rules. At block 312, a determination is made whether the packet's PTI is greater than the present check's (which is the first check in this first iteration) check threshold. If the determination at block 312 is YES, the packet's PTI is greater than the present check's check threshold, the method continues at block 318 to skip performance of the check and progress to selecting a next check, if any further checks remain in the collection. If the determination at block 312 is NO, the packet's PTI is not greater than the present check's check threshold, the method continues at block 314 to perform the check in accordance with the check's inspection rules.

At block 318, a determination is made whether there are any more checks in the collection to process. In one or more embodiment, the checks collection is associated with a set of consideration rules that can be applied to determine whether there are any more checks available to process.

If the determination at block 318 is that YES, there are more checks in the collection to process, the method continues at block 320. At block 320, the next check in the collection is selected. A determination of which check is next in the collection can be in accordance with the consideration rules, e.g., a predetermined order or dynamically determined order. After the check is selected, the method continues at block 310. If the determination at block 318 is that NO, there are no further checks in the collection to process, the method continues at block 322. Blocks 312, 314, 316, 318, and 320 can be performed iteratively until the checks in the collection selected for the packet are performed, or the packet is dropped.

At block 322, a determination is made whether the packet's PTI is above a predetermined drop threshold. If the determination at block 322 is YES, the packet's PTI is above the drop threshold, the method continues at block 324. At block 324, the packet is forwarded. If the determination at block 322 is NO, the packet's PTI is not above the drop threshold, the method continues at block 326. At block 326, the packet is dropped.

At block 314, which is executed upon a negative determination by block 312, the check is performed in accordance with the check's inspection rules. Furthermore, in accordance with the inspection rules, the packet may be marked to be dropped, such as if the result of a test performed as a part of performing the check indicates that the packet is malicious. In one or more embodiments, based on a result of the check, the packet's source IP address' PTI may be adjusted (up or down) in the PTI database system and/or the packet's PTI may be adjusted (up or down). In one or more embodiments, one or more counters can be incremented, decremented, or cleared based on the results of the check. Dropping of the packet, adjustment to the packet's PTI, and/or adjustment to the packet's source IP address' PTI stored in the PTI database system can be performed when the corresponding counter reaches a predetermined value.

In this way, positive results of the check can be used to increase the packet's PTI and/or the packet's source IP address' PTI stored in the PTI database system. When the packet's PTI is increased, the packet may need to undergo fewer checks (e.g., iterations of block 314). When the packet's source IP address' PTI is increased, future packets having the same source IP address may need to undergo fewer checks. Negative results of the check can be used to decrease the packet's PTI and/or the packet's source IP address' PTI stored in the PTI database system. When the packet's PTI is decreased, the packet may be detected as malicious sooner, undergoing fewer checks before being blocked. When the packet's source IP address' PTI is decreased, future packets having the same source IP address may need to undergo fewer checks before being dropped.

At block 316, a determination is made whether the packet is marked to be immediately dropped. In some embodiments this determination includes a comparison of the packet's PTI to the drop threshold. If the determination at block 316 is YES, the packet is marked to be immediately dropped, the method continues at block 326 (at which the packet is dropped). If the determination at block 316 is NO, the packet is not marked to be immediately dropped, the method continues at block 318 to continue checking for further checks in the collection to perform, if any.

The method ends with either block 324 or 326, at which point the method is repeated with the receipt of a next packet at step 302.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network monitor system 100 and PTI database manager 112 may be implemented or executed by one or more computer systems. For example, network monitor system 100 and PTI database manager 112 can be implemented using a computer system such as example computer system 400 illustrated in FIG. 4. In various embodiments, computer system 400 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 400 is only one example of a suitable system and is not intended to suggest any limitation as to the scope of use or functionality of embodiments of the disclosure described herein. Regardless, computer system 400 is capable of being implemented and/or performing any of the functionality set forth hereinabove.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types. Computer system 400 may be practiced in distributed data processing environments where tasks are performed by remote processing devices that are linked through a communications network. In a distributed data processing environment, program modules may be located in both local and remote computer system storage media including memory storage devices.

Figure 4:
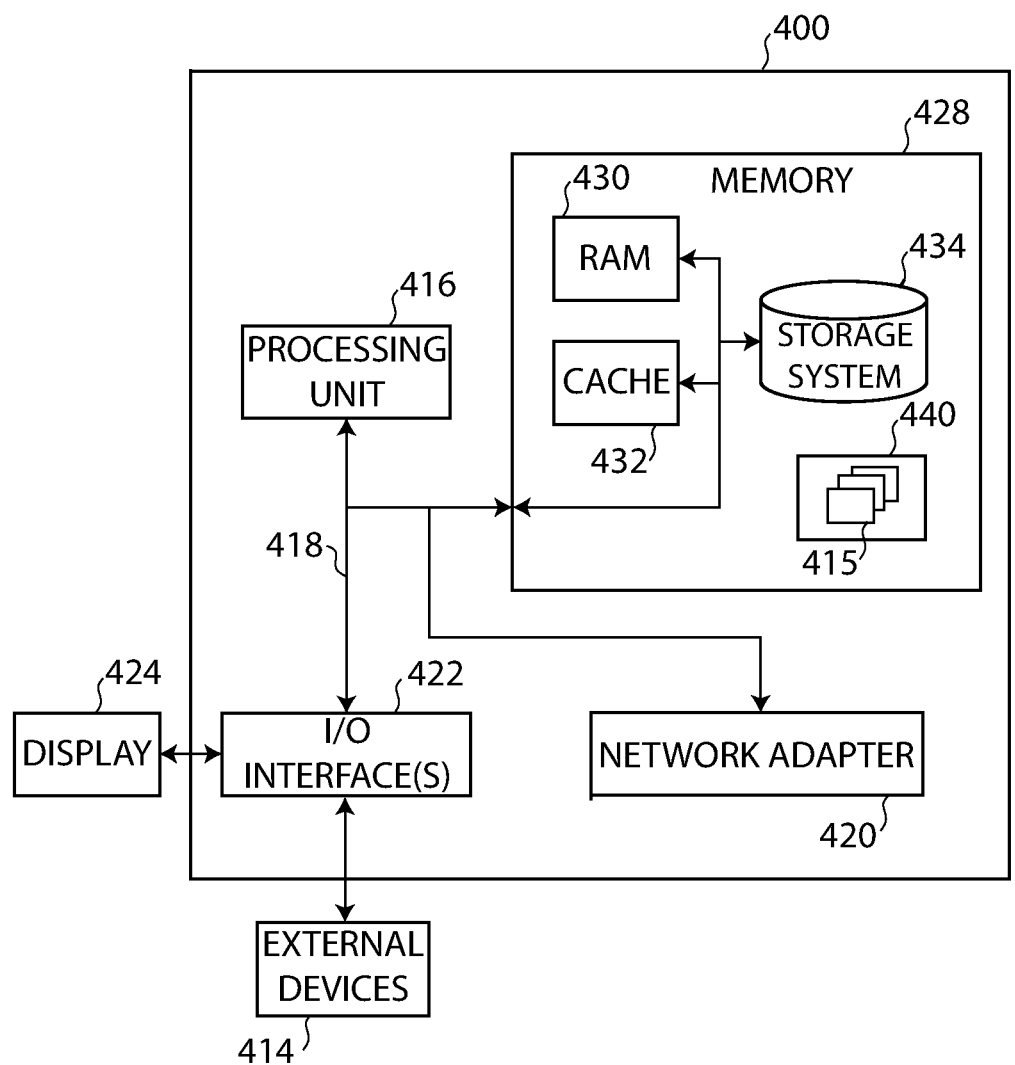
FIG. 4 illustrates an example computing system that could be used to implement a network monitor of a network protection system, in accordance with one or more embodiments of the present disclosure.

Computer system 400 is shown in FIG. 4 in the form of a general-purpose computing device. The components of computer system 400 may include, but are not limited to, one or more processors or processing units 416, a system memory 428, and a bus 418 that couples various system components including system memory 428 to processor 416.

Computer system 400 typically includes a variety of computer system readable media. Such media may be any available media that is accessible by computer system 400, and it includes both volatile and non-volatile media, removable and non-removable media.

System memory 428 can include computer system readable media in the form of volatile memory, such as random access memory (RAM) 430 and/or cache memory 432. Computer system 400 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415, such as computer system 400, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 400 may also communicate with one or more external devices 414 such as a keyboard, a pointing device, a display 424, etc.; one or more devices that enable a user to interact with computer system 400; and/or any devices (e.g., network card, modem, etc.) that enable network monitor system 100 to communicate with one or more other computing devices. Such communication can occur via Input/Output (I/O) interfaces 422. Still yet, computer system 400 can communicate with one or more networks such as a local area network (LAN), a general wide area network (WAN), and/or a public network (e.g., the Internet) via network adapter 420. As depicted, network adapter 420 communicates with the other components of network monitor system 100 via bus 418. It should be understood that although not shown, other hardware and/or software components could be used in conjunction with computer system 400. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of monitoring a network, the method comprising:
   receiving a packet of network traffic;
   determining a source IP address of the packet;
   consulting a database of source IP addresses, each source IP address stored in the database having an associated probability of threat indicator (PTI), wherein the PTI indicates a probability of threat posed by the source IP address;
   assigning the packet's source IP address' PTI to the packet as the packet's PTI;
   comparing the packet's source IP address' PTI to a plurality of thresholds each corresponding to a different one of a plurality of inspection checks;
   determining, based on the comparison, a subset of inspection checks each corresponding to a respective threshold of the plurality of thresholds that the packet's source IP address' PTI exceeds;
   performing each inspection check of the subset of inspection checks;
   assigning treatment of the packet based on a result of the subset of inspection checks that were performed; and
   adjusting the packet's source IP address' PTI in the database of source IP addresses and the packet's PTI based on the result of the subset of inspection checks that were performed.

2. The method of claim 1, further comprising dropping the packet if the packet's source IP address' PTI is below a block list threshold, and only determining whether to perform a next inspection check of the plurality of inspection checks if the packet's source IP address' PTI is not below the block list threshold.

3. The method of claim 1, further comprising forwarding the packet if the packet's source IP address PTI is above an allow list threshold, and only determining whether to perform a next inspection check of the plurality of inspection checks if the packet's source IP address' PTI is not above the allow list threshold.

4. The method of claim 1, wherein if the packet's source IP address is not included in the database of source IP addresses, the method further includes storing the packet's source IP address in the database of source IP addresses with an associated PTI that is set to a neutral value.

5. The method of claim 1, wherein adjusting the packet's PTI is performed before accessing a next of the plurality of inspection checks to perform on the packet.

6. The method of claim 1, wherein adjusting the packet's PTI is a function of a number of times that accessed inspection checks was passed or failed.

7. The method of claim 1, wherein adjusting the packet's source IP address' PTI is a function of a number of times at least one of the accessed inspection checks was passed or failed.

8. The method of claim 1, wherein the method is performed by a processor, and the database of source IP addresses is available to at least one other processor.

9. A network monitor system comprising:
   a memory configured to store instructions;
   a processor and in communication with the memory, wherein the processor upon execution of the instructions is caused to:
   receive a packet of network traffic;
   determine a source IP address of the packet;
   consult a database of source IP addresses, each source IP address stored in the database having an associated probability of threat indicator (PTI), wherein the PTI indicates a probability of threat posed by the source IP address;
   compare of the packet's source IP address' PTI to a plurality of thresholds each corresponding to a different one of a plurality of inspection checks;
   determine, based on the comparison, a subset of inspection checks each corresponding to a respective threshold of the plurality of thresholds that the packet's source IP address' PTI exceeds;
   perform, each inspection check of the subset of inspection checks;

assign treatment of the packet based on a result of the subset of inspection checks that were performed; and adjust the packet's source IP address' PTI in the database of source IP addresses and the packet's PTI based on the result of the subset of inspection checks that were performed.

10. The network monitor system of claim 9, wherein the processor, upon execution of the instructions, is further caused to drop the packet if the packet's source IP address' PTI is below a block list threshold, wherein a next inspection check of the plurality of inspection checks is only determined to be performed if the packet's source IP address' PTI is not below the block list threshold.

11. The network monitor system of claim 9, wherein the processor, upon execution of the instructions, is further caused to forward the packet if the packet's source IP address' PTI is above an allow list threshold, wherein a next inspection check of the plurality of inspection checks is only determined to be performed if the packet's source IP address' PTI is not above the allow list threshold.

12. The network monitor system of claim 9, wherein the processor upon execution of the instructions is caused to, when the packet's source IP address is not included in the database of source IP addresses, store the packet's source IP address in the database of source IP addresses with an associated PTI that is set to a neutral value.

13. The network monitor system of claim 9, wherein adjusting the packet's PTI is performed before accessing a next of the plurality of inspection checks to perform on the packet.

14. The network monitor system of claim 9, wherein adjusting the packet's PTI is a function of a number of times that accessed inspection checks was passed or failed.

15. The network monitor system of claim 9, wherein adjusting the packet's source IP address' PTI is a function of a number of times at least one of the accessed inspection checks was passed or failed.

16. A non-transitory computer readable storage medium storing one or more computer programs embedded therein, the computer programs comprising instructions, which when executed by a computer system, cause the computer system to:

receive a packet of network traffic;

determine a source IP address of the packet;

consult a database of source IP addresses, each source IP address stored in the database having an associated probability of threat indicator (PTI), wherein the PTI indicates a probability of threat posed by the source IP address;

compare of the packet's source IP address' PTI to a plurality of thresholds each corresponding to a different one of a plurality of inspection checks;

determine, based on the comparison, a subset of inspection checks each corresponding to a respective threshold of the plurality of thresholds that the packet's source IP address' PTI exceeds;

perform, each inspection check of the subset of inspection checks;

assign treatment of the packet based on a result of the subset of inspection checks that were performed; and adjust the packet's source IP address' PTI in the database of source IP addresses and the packet's PTI based on the result of the subset of inspection checks that were performed.

* * * * *